Figure 1:
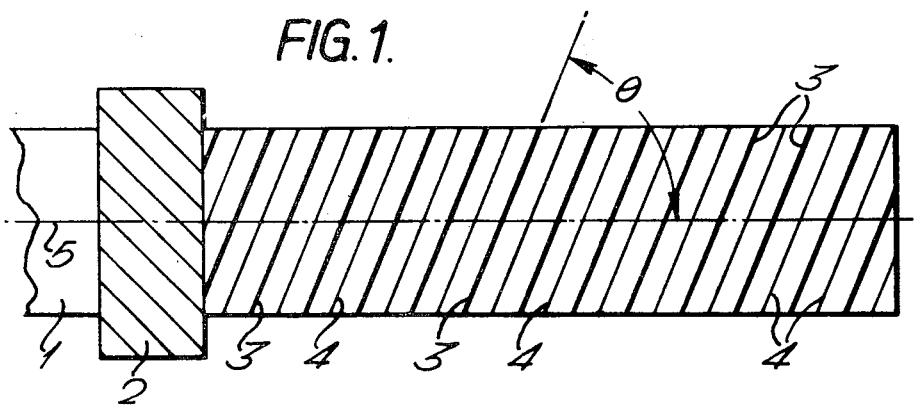

United States Patent [19]
Noakes et al.

[11] 3,992,330
[45] Nov. 16, 1976

[54] FABRICATING BODIES

[75] Inventors: Michael Lesney Noakes; Wilfred George Caesar, both of Reading; Henry Lloyd, Wantage, all of England

[73] Assignee: United Kingdom Atomic Energy Authority, England

[22] Filed: Oct. 29, 1974

[21] Appl. No.: 519,008

[30] Foreign Application Priority Data
Nov. 8, 1973  United Kingdom............... 51977/73

[52] U.S. Cl. .......................... 252/466 J; 252/477 R; 29/163.5 F
[51] Int. Cl.² ...................... B01J 21/04; B01J 35/02
[58] Field of Search .................... 252/477 R, 466 J; 29/157.3 D, 163.5 F

[56] References Cited
UNITED STATES PATENTS

| | | | |
|---|---|---|---|
| 574,157 | 12/1896 | Ljungstrom | 165/166 |
| 1,113,151 | 10/1914 | Chisholm | 252/477 R |
| 2,763,906 | 9/1956 | Sterick | 29/163.5 F |
| 3,755,204 | 8/1973 | Sergeys | 252/477 R |
| 3,785,781 | 1/1974 | Hervert et al. | 252/477 R |

*Primary Examiner*—W. J. Shine
*Attorney, Agent, or Firm*—Larson, Taylor and Hinds

[57] ABSTRACT

A method of manufacturing a body having channels extending through it and a body so formed. The method comprises the steps of working a single strip of material to provide corrugations the crests and valleys of which extend in a direction across the strip. The strip is then folded about an axis which lies at an angle to the crests of the corrugations in order to form layers each having the crests of the corrugations angled to, and lying across the crests of the corrugations of an adjacent layer or adjacent layers.

9 Claims, 7 Drawing Figures

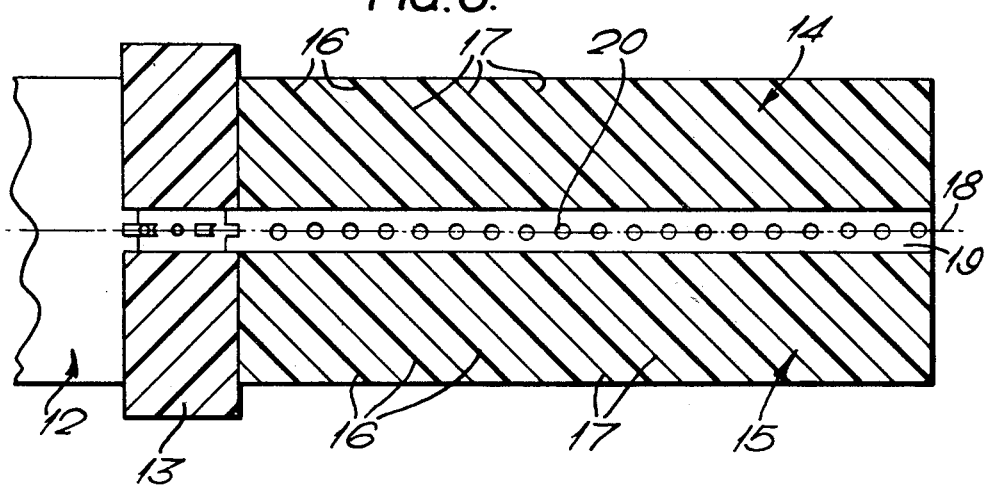
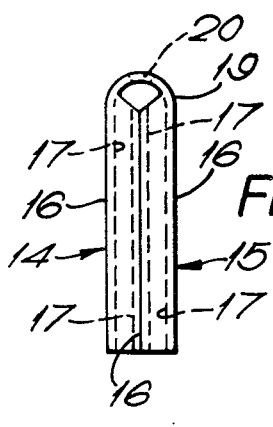

FABRICATING BODIES

This invention relates to methods of fabricating bodies which are constructed to have channels extending through them.

One way of fabricating such bodies is to lay together two or more corrugated sheets, which have identical parallel corrugations, in such a way that adjacent sheets touch along their crests. It is customary to join the sheets together along the crests of the corrugations. It is, however, very difficult to position each sheet accurately relative to the other when producing such bodies on a production-line. It is particularly difficult to avoid nesting of crests of one sheet into the valleys of an adjacent sheet. This problem is even greater if it is not possible to join the sheets together, but it is desired to maintain the sheets in contact with each other. Similarly, if a single corrugated sheet is wound upon itself to form a coil, it is difficult to prevent the crests of one layer nesting in the valleys of the next inner layer.

One way of lessening these problems has been to bond a separate plain sheet to the corrugated sheet. In this way the plain sheet serves as a dividing wall which prevents the crests of the corrugations of each layer nesting into the valleys of adjacent layers when the sheets are laid up. Here again, during production it is necessary to have two sources of sheets, one of which is passed through corrugating rolls and the other not. The corrugated sheet has to be fed to the corrugating rolls at a faster rate than the speed of movement of the plain sheet so that when the sheets are brought together and joined they are moving together at the same velocity. Since the sheets are bonded together, the end product of this stage of production is fairly easy to handle and there is very little difficulty in laying up such duplex sheets to form the desired final body.

However, there are instances where it is uneconomic or undesirable to join two sheets together.

According to one aspect of the present invention there is provided a method of manufacturing a body comprising the steps of working a single strip of material to provide corrugations the crests and valleys of which extend in a direction across the strip, and folding the strip about one or more or axes which lie at an angle to the crests of the corrugations to form layers each having the crests of the corrugations angled to, and lying across the crests of the corrugations of an adjacent layer or adjacent layers.

According to a further aspect of the present invention there is provided a body having channels extending therethrough comprising a single strip of material provided with corrugations the crests and valleys of which extend in a direction across the strip, the strip being folded about one or more axes which lie at an angle to the crests of the corrugations to form alternate layers each having the crests of the corrugations angled to, and lying across the crests of the corrugations of the adjacent layer.

Preferably the crests and valleys of the corrugations extend transversely of, and angularly inclined to, the length of the strip.

In this case the strip may be folded about an axis which extends across the strip substantially normal to the length of the strip. Alternatively, the strip may be folded about an axis which extends in a direction along the strip. The strip may be folded about successive axes spaced along, or alternatively across, the strip, for example by folding the strip in a zig-zag manner. In all these cases, the crests and valleys extend in a direction which is at an angle to the longitudinal axis of the strip.

In the case where the strip is folded about an axis which lies at an angle to the crests of the corrugations to form a double layer, the method may further include the step of laying the double layer on to itself to form a multilayer body each layer of which is corrugated and has the crests of the corrugations of each layer angled to and lying across, the crests of corrugations of adjacent layers.

The laying step may be accomplished by folding the double layer about a transverse axis across the strip or about an axis extending along the strip. In this way, a plurality of double layers of the strip may be laid up to form effectively alternate corrugated sheets with the crests of the sheets angled to, and lying across the crests of adjacent sheets.

Alternatively, the laying step may be accomplished by winding the double layer of strip into a coil.

The strip may be folded at a position intermediate the ends of the strip about an axis which lies at an angle to the crests of the corrugations in which case the winding step may be started at the region where it is folded. In this instance the folding and winding steps may take place simultaneously.

In the case where the strip is folded about an axis extending along the strip, the winding step may be started at one end of the strip.

The strip may be subsequently separated along the region that it is folded for example by cutting or slitting the strip. To assist the folding, the strip may be provided with lines of weakness along the region to be folded. This may be achieved by perforating the strip along the line of the fold. Additionally, the whole or parts of the corrugated regions of the strip may be perforated.

The strip may be made of any desired material depending upon the intended use of the body. For example if the body is to be used as an electrical resistance heater for heating a fluid flowing through the voids between the contiguous sheets the strip may be made from an electrically conductive material such as a metal; carbon; or a ceramic such as electrically conductive silicon nitride or a ferroelectric material having a perovskite type of crytal structure, for example lanthanum barium titanate.

If the body is to be used as a screen or filter then the strip may be made of a porous filter or screening material which can be worked into corrugated regions, for example, metal, fibres, paper, plastic material or felts.

The strip may be made of metal, such as for example, an aluminum bearing ferritic steel of the type known as FECRALLOY (a Trade Mark of the United Kingdom Atomic Energy Authority), or may be a ceramic substrate, such as for example, silicon nitride, alumina, or lanthanum barium titanate.

The body may form a catalyst support such as for example for use in treating combustion products of the exhaust gases of an internal combustion engine. In this case a catalyst is applied to the strip, or the strip is made from a material which is itself a catalyst.

The catalyst may be a noble metal and in particular, when using as a catalyst for catalysing the reaction of the products of combustion of an internal combustion engine the catalyst may be platinum, palladium, iridium or rhodium or an alloy of one or more of these elements.

The strip may be fabricated from any substrate which would support a catalyst and which could be worked in accordance with the present invention to provide the corrugations.

The catalyst may be applied to the strip before the strip is worked to provide it with the corrugations or after the strip has been worked. Alternatively it may be possible to apply the catalyst to the completed body.

The strip may be coated with a powder prior to applying the catalyst to extend the surface area of the strip. Alternatively the surface of the strip may be roughened prior to applying the catalyst to achieve the same aim.

The body may be used to effect pyrolysis if the strip is made from, or coated with, a material which will effect pyrolysis of a fluid flowing through the voids between adjacent contiguous sheets.

The present invention will now be described with reference to the accompanying drawings in which:

FIGS. 1 to 7 illustrate the working, folding and laying steps of methods of manufacturing bodies in accordance with the present invention.

In the following examples the end products are intended for use as a catalyst in an exhaust gas purification system for an internal combustion engine. The strip is made of aluminium bearing ferritic steel, of the type known as FECRALLOY (a Trade Mark of the United Kingdom Atomic Energy Authority) to which is applied a catalytic material, such as for example platinum, or palladium metal. The strip is 0.002 ins (0.05 mm) thick 4 inches (101.6 mm) wide, and of various lengths.

Referring to FIG. 1 a plain length of strip 1 is fed into the nip of two corrugating rolls 2 to produce corrugations the crests 3 and valleys 4 of which extend in a direction across the strip at an acute angle $\theta$ to the longitudinal axis 5 of the strip 1.

Figure 2:
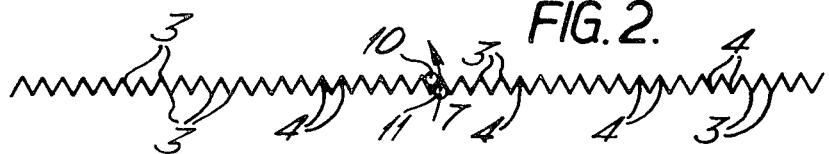
Figure 3:
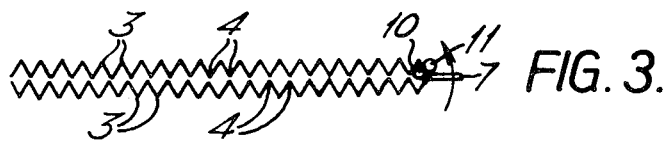
Figure 4:
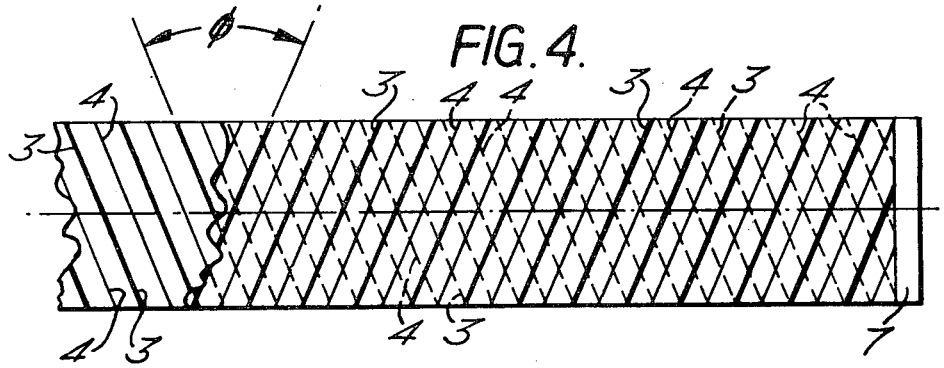

The strip 1 so formed is folded at a position intermediate the ends of the strip 1 about an axis which is normal to the longitudinal axis 5 of the strip, as illustrated in FIGS. 2 and 3. It may be necessary to flatten the corrugations in the vicinity of the fold as shown in FIG. 4 at region 7. For convenience, to illustrate the fact that the crests 3 of one layer lies at an angle, $\theta$, to the crests of the other layer, one layer is shown, in FIG. 4, as being shorter than the other. In practice each layer will be approximately the same length.

To effect folding of the strip 1 a two-pronged tool is used (see FIGS. 2 and 3). One prong 10 is positioned across the strip 1 on one side and the other prong 11 is placed across the strip 1 on the other side. By rotating the two-pronged tool about an axis transverse to the strip 1 the strip 1 is caused to fold over as shown in FIGS. 3 and 4.

Figure 5:
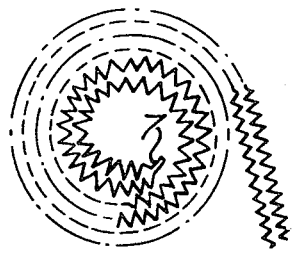

Further rotation of the tool causes the double layer of the folded strip to be wound simultaneously into a coil as shown in FIG. 5. During the winding operation relative movement between each layer may take place since the layers are not effectively joined along their length.

Instead of winding the folded double layer of strip 1 into a coil, one can fold the corrugated strip 1 in a zig-zag manner as it comes off the rolls 2. Hence by folding a single layer of the strip 1 alternately first one way and then the other about successive transverse axes spaced along the strip, it is possible to build up a body comprising alternate corrugated layers, formed from a single continuous strip. Each layer has the crests of the corrugations angled to and lying across the crests of adjacent layers.

Similarly a double layer of the strip 1 as shown in FIG. 3 may be folded alternately first one way and then the other about successive transverse axes spaced along the strip, in a zig-zag manner.

Referring to FIG. 6 a plain length of strip 12 is fed into the nip of two corrugating rolls 13 to produce two sets of corrugations 14, 15 the crests 16 and valleys 17 of which extend in a direction across the strip 12 at an acute angle to the longitudinal axis 18 of the strip 12. The corrugating rolls 13 are designed to leave a plain uncorrugated region 19 extending along the longitudinal axis 18 and to punch holes 20 in the region 19.

The strip 12 so formed is folded along region 19 about the longitudinal axis 18.

When folded about axis 18 the crests of corrugations 14 lie at an angle to the crests of corrugations 15.

The double layer of the folded strip is then wound into a coil in a similar manner to that described above with reference to FIG. 5, but instead of starting the winding step at a position intermediate the ends of the strip, the winding step is started at one end of the strip.

Instead of folding the strip 12 about a single axis extending along the strip 12 it can be folded in a zig-zag manner about axes spaced across the strip 12 and which extend along the strip 12. This requires the provision of more than one region 19 and holes 20, that is to say one region 19 and set of holes 20 is required along the line of each fold.

By folding a single layer of strip 12 alternately first one way and then the other about successive axes extending along the strip parallel to the longitudinal axis 18 it is possible to build up a body comprising alternate corrugated layers, formed from a single continuous strip.

Similarly, a double layer of strip 12 formed by folding it about the longitudinal axis 18 can be further folded in a zig-zag manner about successive axes which extend in directions normal to the longitudinal axis 18.

If desired, the strip 12 may be sheared along the line of the perforations 20 after folding it about axis 18. The shearing may be done before or after laying up or winding the strip in to a coil.

The cross-sectional shape of the corrugations may be of any desired form for example, it may be a succession of alternate inverted and non-inverted "V" or "U" shapes, or rectangular channels or may be of sinusoidal form.

Similarly the catalysts and methods of depositing the catalysts described in these patent applications may be used with the bodies of the present invention.

Finally, when the metal used is an aluminum bearing ferritic steel, the steel can be oxidized to form an alumina layer on a surface thereof.

We claim:

1. A method of manufacturing a body having channels extending through it, comprising the steps of working a single strip of aluminium bearing ferritic steel to provide corrugations the crests and valleys of which extend in a direction across the strip, and folding the strip about one or more axes which lie at an angle to the crests of the corrugations to form layers each having the crests of the corrugations angled to, and lying across the crest of the corrugations of an adjacent layer or adjacent layers, and forming an oxide layer on the surface of the steel by oxidation of the steel.

2. A method according to claim 1 wherein a catalyst is applied to the strip.

3. A method according to claim 2 wherein the catalyst is applied to the strip before the strip is worked to provide it with the corrugations.

4. A method according to claim 2 wherein the catalyst is applied to the strip after the strip has been worked to provide it with the corrugations.

5. A method according to claim 2 wherein the strip is coated with a powder prior to applying the catalyst to extend the surface area of the strip.

6. A body comprising a single strip of an aluminium bearing ferritic steel which has an alumina layer formed on a surface thereof, the strip being provided with corrugations the crests and valleys of which extend in a direction across the strip, the strip being folded about one or more axes which lie at angle to the crests of the corrugations to form alternate layers each having the crests of the corrugations angled to, and lying across, the crests of the corrugations of an adjacent layer.

7. A body according to claim 6 wherein a catalyst is applied to the strip.

8. A body according to claim 7 wherein the catalyst is applied to the strip prior to working the strip to provide the corrugations.

9. A body according to claim 7 wherein the catalyst is applied to the strip after it has been worked to provide it with the corrugations.

* * * * *